US012157301B2

(12) United States Patent
Kobayashi et al.

(10) Patent No.: US 12,157,301 B2
(45) Date of Patent: Dec. 3, 2024

(54) PRINTING APPARATUS

(71) Applicant: BROTHER KOGYO KABUSHIKI KAISHA, Nagoya (JP)

(72) Inventors: Isao Kobayashi, Nagoya (JP); Yusuke Arai, Nagoya (JP)

(73) Assignee: BROTHER KOGYO KABUSHIKI KAISHA, Nagoya (JP)

(*) Notice: Subject to any disclaimer, the term of this patent is extended or adjusted under 35 U.S.C. 154(b) by 210 days.

(21) Appl. No.: 17/930,752

(22) Filed: Sep. 9, 2022

(65) Prior Publication Data

US 2023/0096924 A1 Mar. 30, 2023

(30) Foreign Application Priority Data

Sep. 30, 2021 (JP) ................................ 2021-160228

(51) Int. Cl.
*B41J 11/66* (2006.01)

(52) U.S. Cl.
CPC .................................. *B41J 11/663* (2013.01)

(58) Field of Classification Search
CPC . B41J 11/663; B41J 11/70; B41J 11/68; B41J 11/703; B41J 3/4075; B26D 5/20; B65H 2701/13
See application file for complete search history.

(56) References Cited

U.S. PATENT DOCUMENTS

2010/0245514 A1 9/2010 Kaimoto et al.
2013/0271544 A1* 10/2013 Yajima .................... B41J 11/70 83/111
2016/0159118 A1 6/2016 Shishido et al.
2021/0178785 A1 6/2021 Miura
2021/0300092 A1 9/2021 Yajima

FOREIGN PATENT DOCUMENTS

JP 2018-186448 A 11/2018
JP 2021-94784 A 6/2021

OTHER PUBLICATIONS

Office Action issued in related U.S. Appl. No. 17/930,749, filed Jan. 2, 2024.
Notice of Allowance issued in the related U.S. Appl. No. 17/930,749, filed Apr. 19, 2024.

* cited by examiner

*Primary Examiner* — Thinh H Nguyen
(74) *Attorney, Agent, or Firm* — Merchant & Gould P.C.

(57) ABSTRACT

A printing apparatus, having a conveyer, a first conveyer path, a printer, a cutter assembly, and a controller, is provided. The cutter assembly cuts the printing medium into a first part located frontward and a second part located rearward in a first conveying direction. The controller controls the printer to print an image in the second part on one side of the printing medium, controls the conveyer to move the printing medium from the first conveyer path to a second conveyer path through a first switchback action and inverts the printing medium by conveying in a second conveying direction, controls the printer to print an image in the second part on the other side of the printing medium, and controls the cutter assembly to cut the printing medium into a first printing medium having the first part and a second printing medium having the second part.

7 Claims, 12 Drawing Sheets

PRINTING APPARATUS

REFERENCE TO RELATED APPLICATIONS

This application claims priority from Japanese Patent Application No. 2021-160228, filed on Sep. 30, 2021. The entire content of the priority application is incorporated herein by reference.

BACKGROUND ART

A printing apparatus with a cutter assembly capable of cutting a printing medium is known. The printing apparatus may, after printing an image on the printing medium, operate the cutter assembly to cut the printing medium into two pieces to create two printed materials.

DESCRIPTION

With regard to the conventional printing apparatus equipped with the cutter assembly, however, a double-face printing operation to print images on both sides, i.e., recto and verso, of the printing medium may not have been considered.

The present disclosure is advantageous in that a printing apparatus, capable of cutting a printing medium that has been processed through a double-face printing operation, is provided.

Figure 6A:
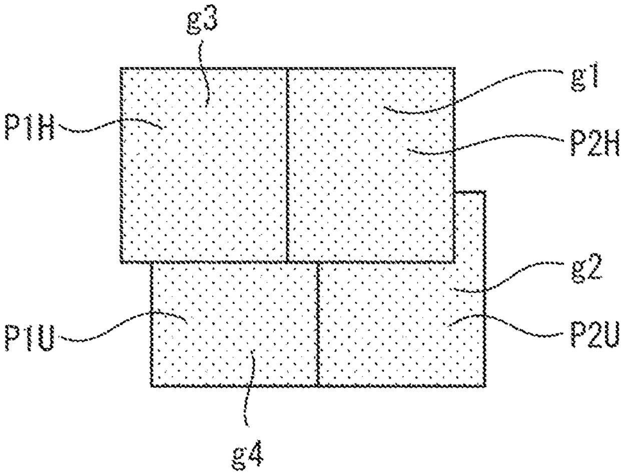
Figure 6B:
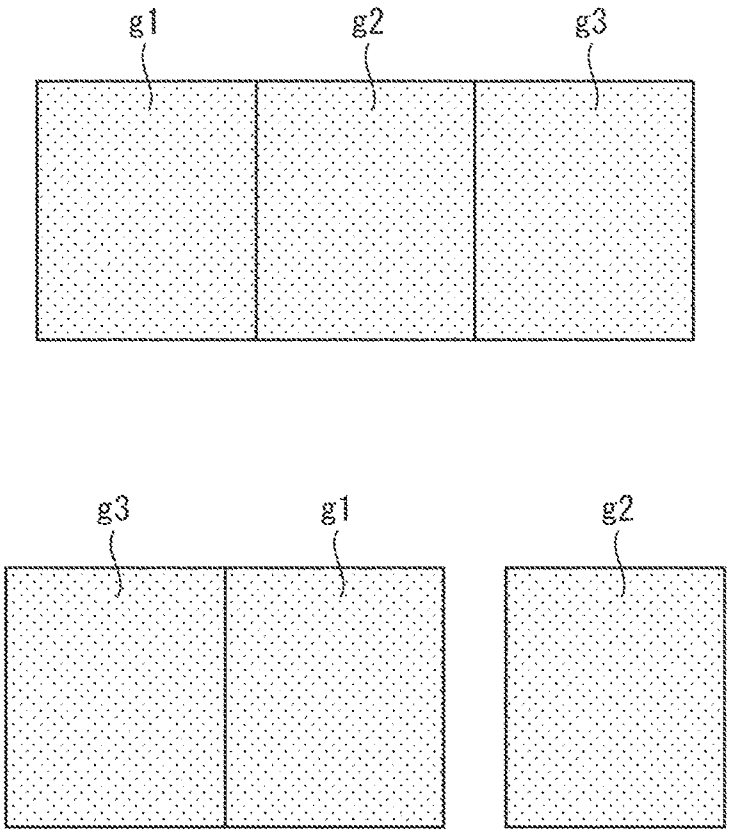
Figure 6C:
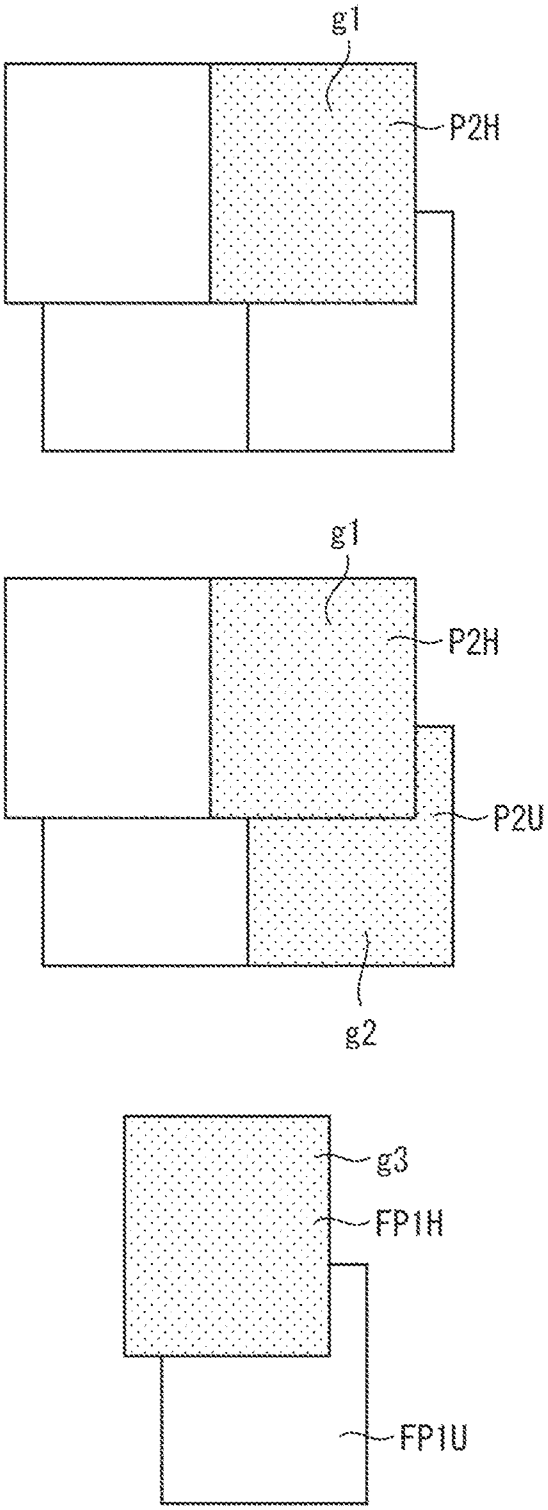

FIG. 6A illustrates how images are printed through a double-face printing operation in the process conducted by the controller in the printing apparatus. FIG. 6B illustrates a process to rearrange data in a RAM in the printing apparatus. FIG. 6C illustrates a memory-saving arrangement in the RAM in the printing apparatus.

Figure 7:
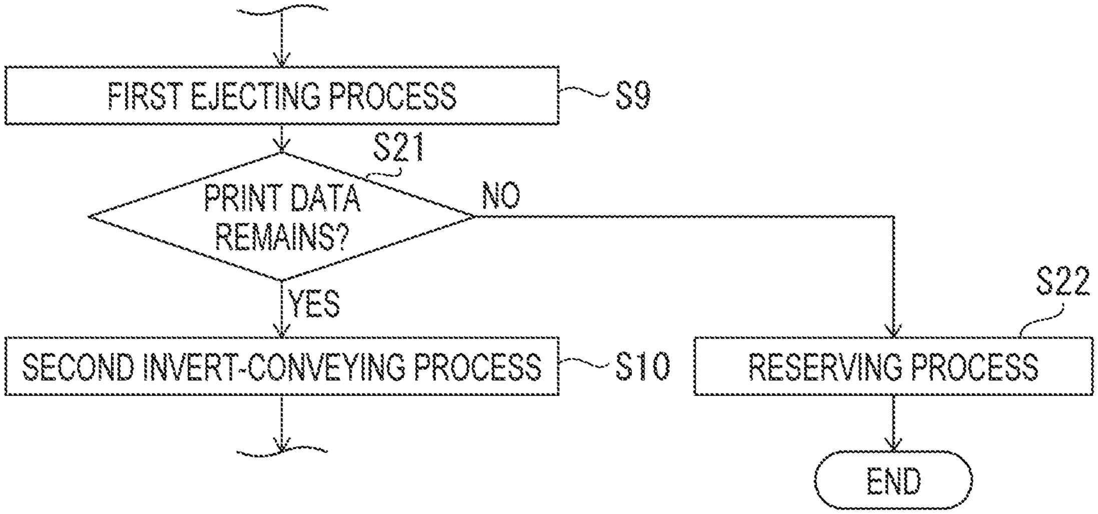

FIG. 7 is a flowchart to illustrate another part of the flow of the process to be conducted by the controller in the printing apparatus.

Figure 8:
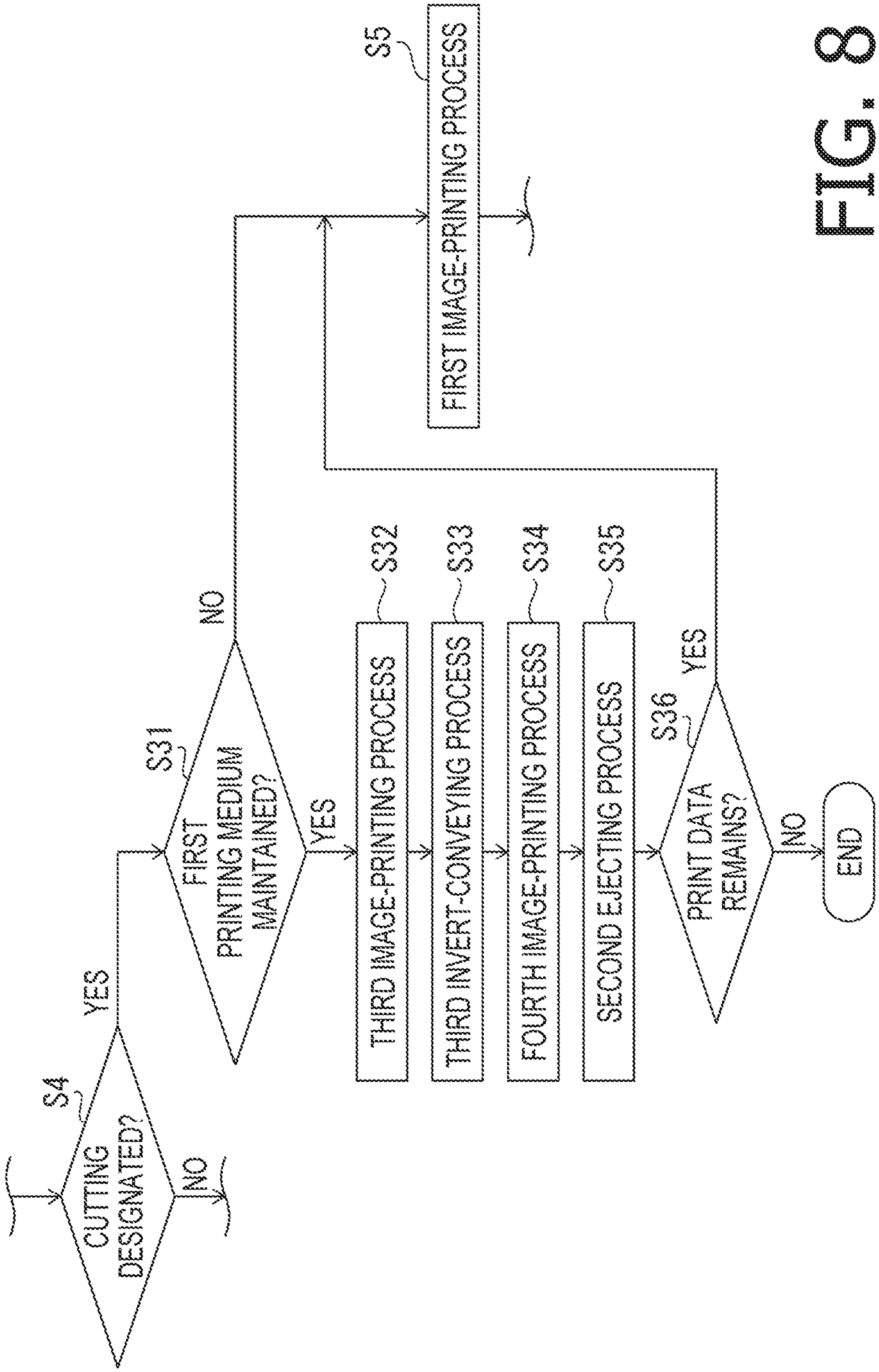

FIG. 8 is a flowchart to illustrate another part of the flow of the process to be conducted by the controller in the printing apparatus.

Figure 9:
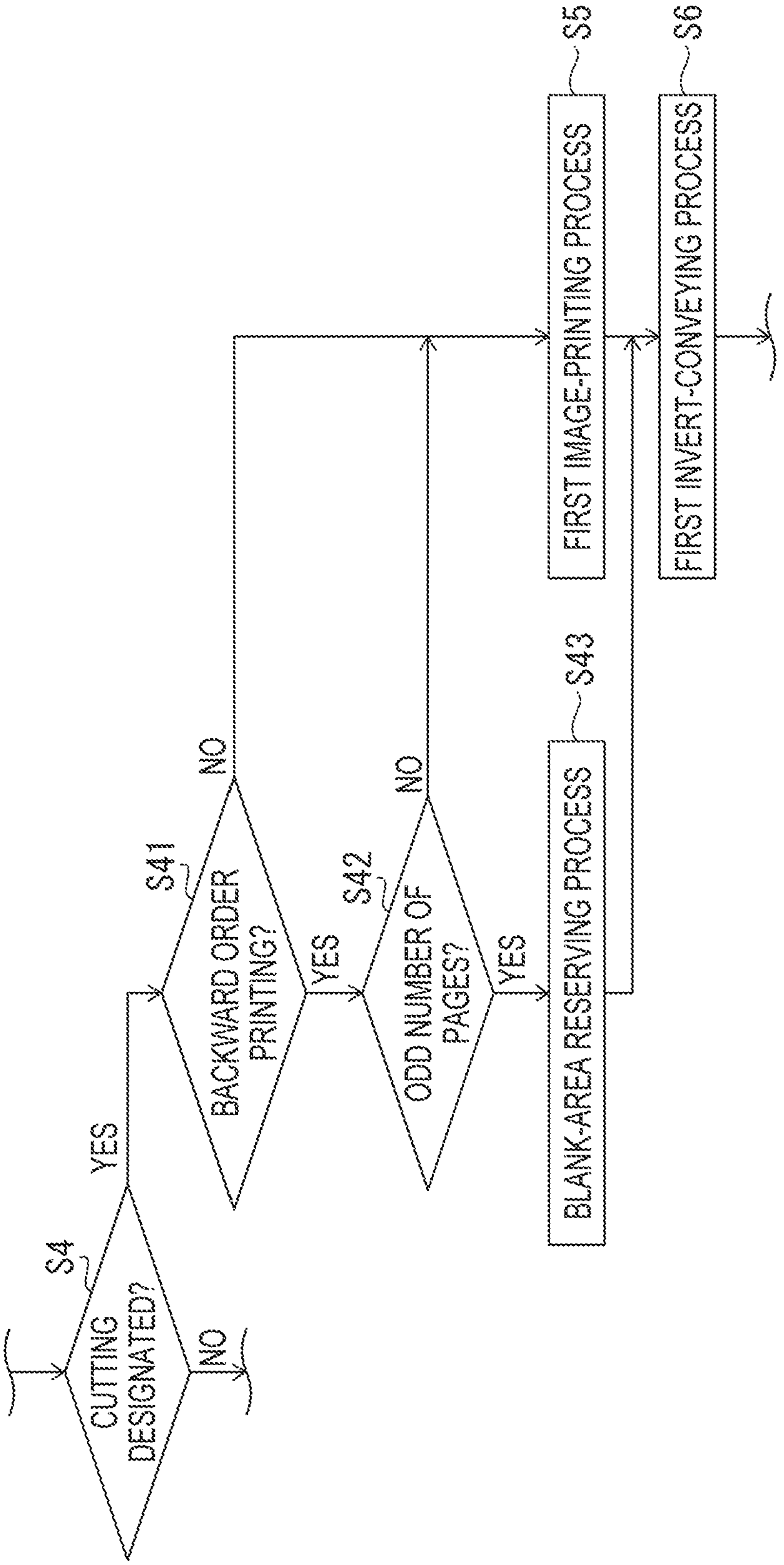

FIG. 9 is a flowchart to illustrate another part of the flow of the process to be conducted by the controller in the printing apparatus.

Figure 10A:
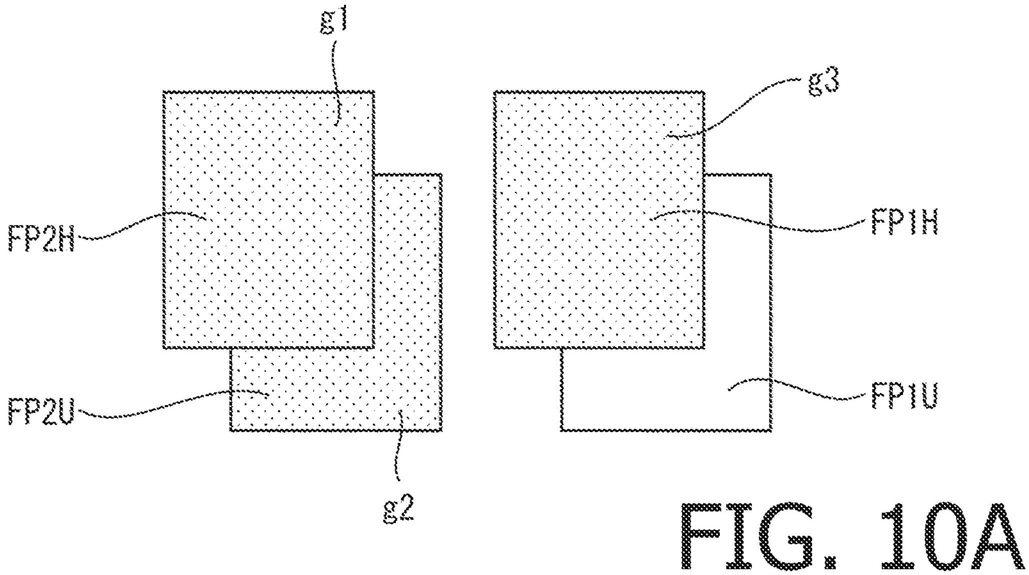
Figure 10B:
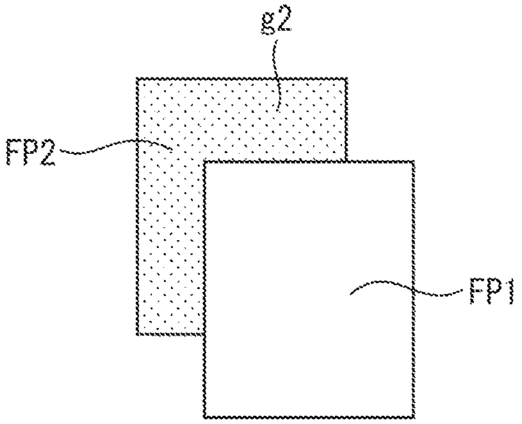

FIG. 10A illustrates how images are printed through a regular-order double-face printing operation. FIG. 10B illustrates an outcome of the regular-order double-face printing operation.

Figure 11A:
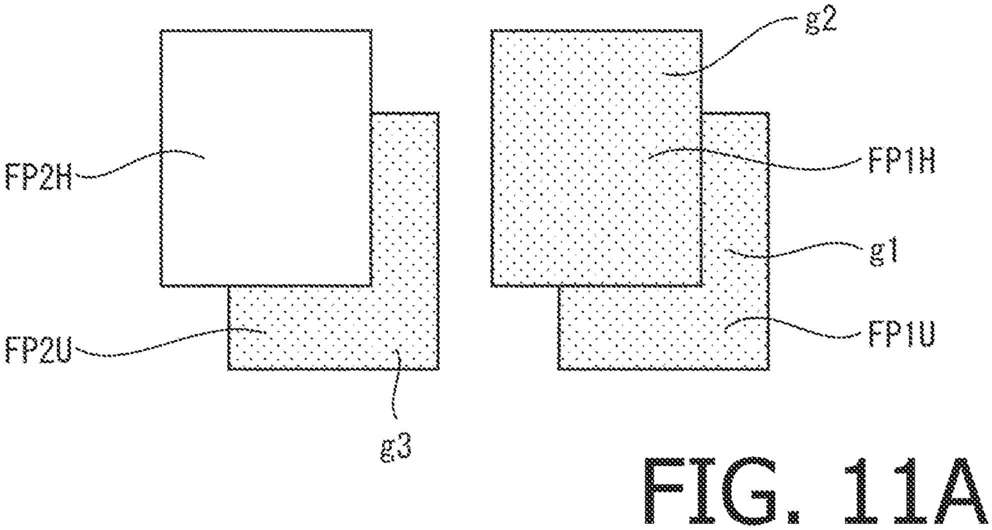
Figure 11B:
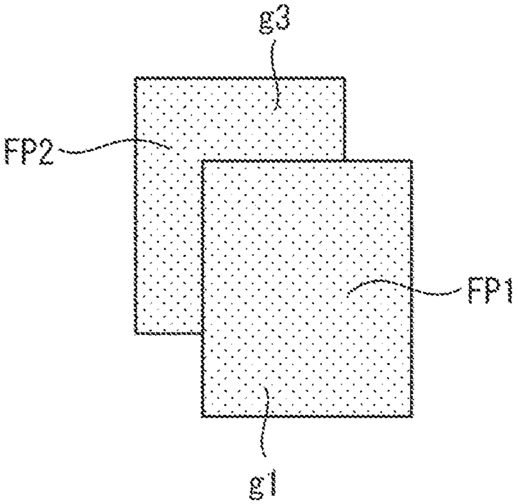

FIG. 11A illustrates how images are printed through a backward-order double-face printing operation. FIG. 11B illustrates an outcome of the backward-order double-face printing operation.

EMBODIMENT

Figure 1:
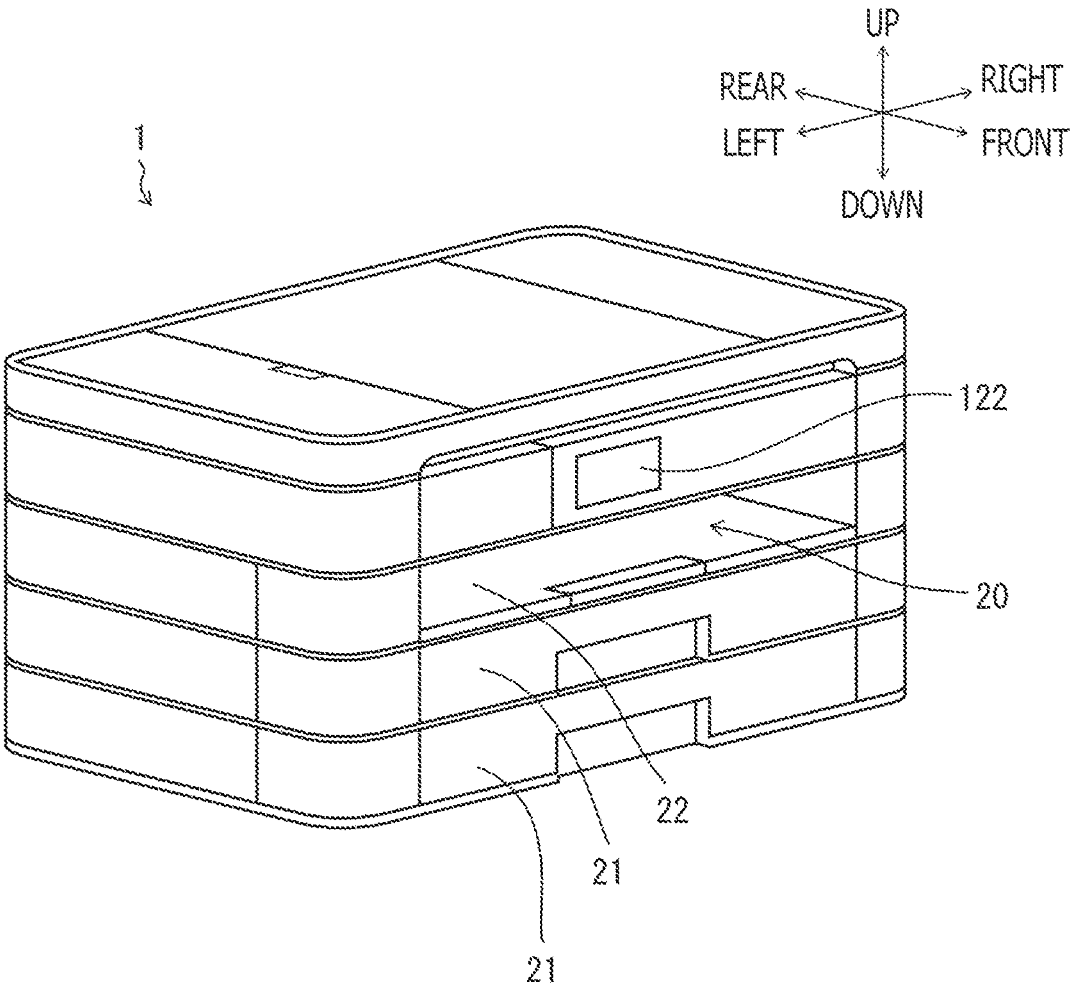
FIG. 1 is a perspective view of a printing apparatus.
Figure 2:
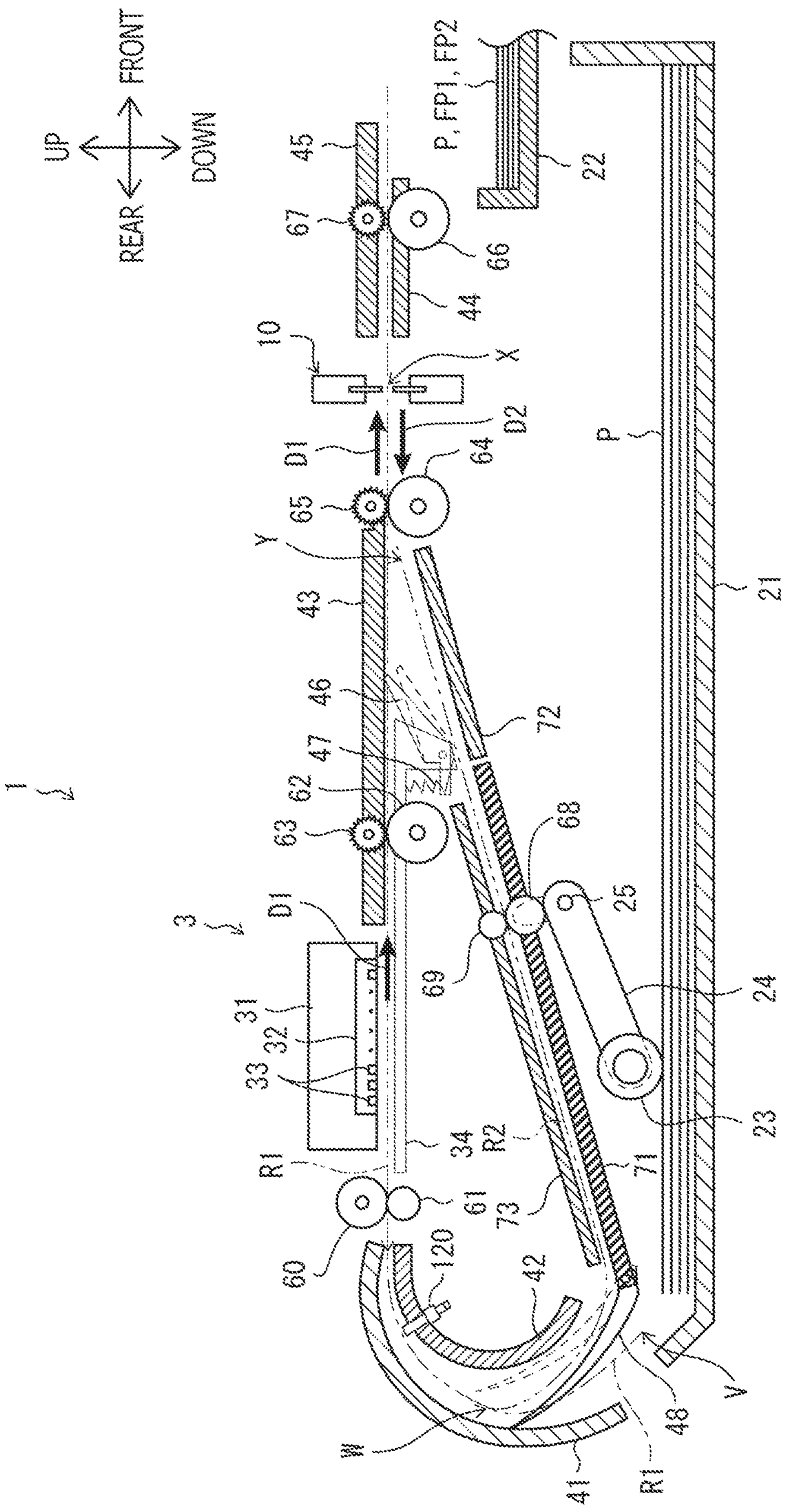
FIG. 2 is a cross-sectional view of the printing apparatus.

Hereinafter, an exemplary embodiment according to an aspect of the present disclosure will be described in detail with reference to the accompanying drawings. FIG. 1 is a perspective view of a printing apparatus 1. FIG. 2 is a cross-sectional view of the printing apparatus 1. In the present embodiment, the printing apparatus 1 is a monochrome printer; however, the printing apparatus 1 may optionally be a multicolor printer that may print multicolored images.

The printing apparatus 1 may include a multifunction peripheral machine (MFP) having a plurality of functions including a printing function, a scanning function, a copying function, and a facsimile transmission/receiving function. In the following description, positional relation within the printing apparatus 1 and each part or item included in the printing apparatus 1 will be mentioned on basis of the printing apparatus 1 in a posture as shown in FIG. 1, with reference to an orientation (up, down, right, left, front, rear) indicated by the bi-directionally pointing arrows.

[Overall Configuration of Printing Apparatus 1]

As shown in FIG. 1, the printing apparatus 1 has a casing having a shape of a substantially rectangular box. The printing apparatus 1 has an inkjet-styled printer, by which ink may be discharged at a printing sheet P based on print data designated by a print job to print images on the printing sheet P. Optionally, the printing apparatus 1 may be a laser printer capable of recording images on the printing sheet P electro-photographically. Moreover, the printing sheet P may not necessarily be limited to paper medium but may include, for example, resin printing sheets such as an overhead projector (OHP) film.

[Configuration of Printing Apparatus 1]

As shown in FIG. 1, on a front side of the printing apparatus 1, an opening 20 is formed. In the opening 20, a feeder tray 21 and an ejection tray 22 are removably arranged. The feeder tray 21 is a case to store printing sheets P and is open upward. As shown in FIG. 1, the printing apparatus 1 may have two (2) or more feeder trays 21, which are stacked vertically. In an upper feeder tray 21, for example, printing sheets P in A4 size may be stored, and in a lower feeder tray 21, for example, printing sheets P in A3 size may be stored.

As shown in FIGS. 1 and 2, at an upper position with respect to the feeder trays 21, the ejection tray 22 is located. The ejection tray 22 is a tray, in which the printing sheets P including a first printing sheet FP1 and a second printing sheet FP2 ejected by a conveyer roller 66 may rest. The ejection tray 22 is open upward. In FIG. 2, in order to simplify the illustration, the lower feeder tray 21 is omitted.

As shown in FIG. 1, on the front side of the printing apparatus 1, a setting device 122 including a display screen is arranged. The setting device 122 may include, for example, a touch panel, through which settings concerning printing actions may be input with a user's touching operations. The setting device 122 may accept settings, which include information concerning the size of the printing sheets P and information indicating whether a cutting action will be conducted. The settings input through the setting device 122 may be output to a controller 100 (see FIG. 3).

As shown in FIG. 2, the printing apparatus 1 has a feeder roller 23, a first conveyer path R1, a conveyer including conveyer rollers 60, 62, 64, 66, 68, a first flap 46, a second flap 48, a second conveyer path R2, and a cutter assembly 10. The conveyer rollers 60, 62, 64, 66, 68 may convey the printing sheets P. A number of rollers in the first conveyer path R1 and the second conveyer path R2 may not necessarily be limited but may be modified optionally. For example, the conveyer roller 66 may be omitted.

The feeder roller 23 may feed the printing sheets P stored in the feeder tray 21 to a conveyance-start position V in the first conveyer path R1. The feeder roller 23 is rotatably supported at a tip end of a feeder arm 24. The feeder arm 24 is pivotably supported by a shaft 25, which is supported by a frame of the printing apparatus 1. The feeder roller 23 may be driven by a feeder motor 107 (see FIG. 3) to rotate normally. By the normal rotation of the feeder roller 23, the printing sheets P stored in the feeder tray 21 may be fed to the conveyance-start position V in the first conveyer path R1 one by one.

The first conveyer path R1 is a path extending from a rear end of the feeder tray 21, curving upward at a part delimited by guide members 41, 42, extending through a position of the printer 3 linearly at a part delimited by guide members 43, 44, 45 to the ejection tray 22. A first conveying direction D1 is a direction, in which, when the printer 3 prints an image on the printing sheet P, the printing sheet P moves through a cutting position X1. In other words, the first conveying direction D1 a direction from the printer 3 toward the cutting position X1. A second conveying direction D2 is an opposite direction to convey the printing sheet P to the first conveying direction D1.

In other words, the first conveyer path R1 is a path, in which the printing sheet P may be conveyed in the first conveying direction D1, and the second conveyer path R2 is a path, in which the printing sheet P switched backward from the first conveyer path R1 may be conveyed in the second conveying direction D2.

At a position upstream from the printer 3 in the first conveying direction D1 along the first conveyer path R1, the conveyer roller 60 is arranged. At a position to face a lower part of the conveyer roller 60, a pinch roller 61 is arranged. The conveyer roller 60 may be driven by a conveyer motor 108 (see FIG. 3) to rotate. The pinch roller 61 may rotate along with the rotation of the conveyer roller 60. By the conveyer roller 60 and the pinch roller 61 rotating normally, the printing sheet P pinched between the conveyer roller 60 and the pinch roller 61 may be conveyed to the printer 3 and farther.

The printer 3 is arranged between the conveyer roller 60 and the conveyer roller 62 along the first conveyer path R1 and may print an image on the printing sheet P. The printer 3 includes a carriage 31, a recording head 32, a plurality of nozzles 33, and a platen 34. The recording head 32 is mounted on the carriage 31. On a lower surface of the recording head 32, the plurality of nozzles 33 are arranged. The recording head 32 may discharge ink droplets through the nozzles 33. The platen 34 is a substantially rectangular plate, on which the printing sheet P may be placed. The platen 34 may support the printing sheet P thereon. While the printing sheet P is supported by the platen 34, the carriage 31 may move, and the nozzles 33 may discharge the ink droplets at the printing sheet P selectively. Thereby, an image may be printed on the printing sheet P.

To the carriage 31, a driving force from a carriage motor 109 (see FIG. 3) may be transmitted, and the carriage 31 may move to reciprocate in a direction intersecting orthogonally with the first conveying direction D1, i.e., a widthwise direction of the printing sheet P. The controller 100 may conduct an image-printing process, in which the controller 100 operates the recording head 32 to discharge the ink droplets from the nozzles while operating the carriage 31 to move in the widthwise direction of the printing sheet P to print one of lines composing an image on the printing sheet P, and a linefeed process, in which the controller 100 operates the conveyer rollers 60, 62 to convey the printing sheet P by a predetermined linefeed amount, alternately and repeatedly to ultimately print the image on the printing sheet P.

As shown in FIG. 2, at a position downstream from the printer 3 in the first conveying direction D1 along the first conveyer path R1, the conveyer roller 62 is arranged. At a position to face an upper part of the conveyer roller 62, a spur roller 63 is arranged. The conveyer roller 62 may be driven by the conveyer motor 108 (see FIG. 3) to rotate. The spur roller 63 may rotate along with the rotation of the conveyer roller 62. By the conveyer roller 62 and the spur roller 63 rotating normally, the printing sheet P pinched between the conveyer roller 62 and the spur roller 63 may be conveyed downstream in the first conveying direction D1.

At a position downstream from the conveyer roller 62 in the first conveying direction D1 along the first conveyer path R1, the conveyer roller 64 is arranged. At a position to face an upper part of the conveyer roller 64, a spur roller 65 is arranged. The conveyer roller 64 may be driven by the conveyer motor 108 to rotate. The spur roller 65 may rotate along with the rotation of the conveyer roller 64. The conveyer roller 64 and the spur roller 65 may rotate either normally or reversely. By the conveyer roller 64 and the spur roller 65 rotating normally, the printing sheet P pinched between the conveyer roller 64 and the spur roller 65 may be conveyed toward the cutter assembly 10. On the other hand, by the conveyer roller 64 and the spur roller 65 rotating reversely, the printing sheet P may be conveyed to the second conveyer path R2 along a lower surface of a first flap 46.

The first flap 46 is arranged at a position between the conveyer roller 62 and the conveyer roller 64 in the first conveyer path R1. The first flap 46 is located in proximity to a branch position Y1, which is below the guide member 43. The first flap 46 is supported by the platen 34 and is pivotable between a first posture and a second posture. When the first flap 46 is in the first posture, as drawn in solid lines in FIG. 2, the first flap 46 contacts the guide member 43 and closes the first conveyer path R1. On the other hand, when the first flap 46 is in the second posture, as drawn in broken lines in FIG. 2, the first flap 46 is located to be lower than the first flap 46 in the first posture and is separated from the guide member 43, reserving a gap to allow the printing sheet P to be conveyed in the first conveying direction D1 between the first flap 46 and the guide member 43.

The first flap 46 is urged upward by a coil spring 47. The coil spring 47 is connected to the first flap 46 at one end and to the platen 34 at the other end. The first flap 46 being urged by the coil spring 47 tends to stay in the first posture, in which a frontward end of the first flap 46 contacts the guide member 43.

The cutter assembly 10 is located between the conveyer roller 64 and the conveyer roller 66 in the first conveyer path R1. The cutter assembly 10 may be a known cutter assembly having a pair of upper and lower blades, between which the printing sheet P may be cut, and a cutter carriage. In particular, the cutter assembly 10 may cut the printing sheet P in the widthwise direction of the printing sheet P by moving the cutter carriage in the widthwise direction.

Moreover, as described further below, the controller 100 operates the cutter assembly 10 to cut the printing sheet P to divide into a first part P1 (see FIG. 5) and a second part P2 (see FIG. 5), which are located frontward and rearward, respectively, in the first conveying direction D1 in the first conveyer path R1. In other words, the printing sheet P may be divided into a first printing sheet FP1 having the first part P1 and a second printing sheet FP2 having the second part P2. Meanwhile, optionally, the cutter assembly 10 may solely have one of the upper and lower blades.

At a position downstream from the cutter assembly 10 in the first conveying direction D1 along the first conveyer path R1, the conveyer roller 66 is arranged. At a position to face an upper part of the conveyer roller 66, a spur roller 67 is arranged. The conveyer roller 66 may be driven by the conveyer motor 108 (see FIG. 3) to rotate. The spur roller 67 may rotate along with the rotation of the conveyer roller 66. By the conveyer roller 66 and the spur roller 67 rotating normally, the first printing sheet FP1 and the second printing sheet FP2 may be conveyed downstream by the conveyer roller 66 in the first conveying direction D1.

As shown in FIG. 2, at a merge position W between the first conveyer path R1 and the second conveyer path R2, a second flap 48 is arranged pivotably. In particular, the second flap 48 is pivotable between a first posture, as drawn in solid lines in FIG. 2, and a second posture, as drawn in broken lines in FIG. 2. When the second flap 48 is in the first posture, the second flap 48 and the guide member 42 form a part of the second conveyer path R2. On the other hand, when the second flap 48 is in the second posture, the second flap 48 and the guide member 41 form a part of the first conveyer path R1.

At a position upstream from the conveyer roller 60 in the first conveying direction D1 along the first conveyer path R1, a registration sensor 120 is arranged. The registration sensor 120 may detect a front end and a rear end of the printing sheet P moving through a contact position, at which the printing sheet P contacts the conveyer roller 60. The registration sensor 120 may include, for example, a sensor having an actuator that may be moved to swing by the printing sheet P contacting the actuator, and, for another example, an optical sensor.

The registration sensor 120 may output ON signals while the printing sheet P is moving through the contact position and OFF signals while the printing sheet P is absent at the contact position. In other words, the registration sensor 120 outputs the ON signals between a time point, at which the front end of the printing sheet P reaches the position of the registration sensor 120, and a time point, at which the rear end of the printing sheet P passes through the position of the registration sensor 120, or otherwise outputs the OFF signals. The signals from the registration sensor 120 may be output to the controller 100.

To the conveyer roller 60, a rotary encoder 121 (see FIG. 3) that may detect rotation of the conveyer roller 60 is attached. The rotary encoder 121 may output pulse signals to the controller 100 according to the rotation of the conveyer roller 60. The rotary encoder 121 includes an encoder disk and an optical sensor. The encoder disk may rotate along with the rotation of the conveyer roller 60. The optical sensor may read the rotating encoder disk, generate pulse signals, and output the generated pulse signals to the controller 100.

The second conveyer path R2 is a path delimited at least by guide members 71, 72, 73, the conveyer roller 68, and a pinch roller 69. The second conveyer path R2 branches from the first conveyer path R1 at a branch position Y1, which is at an upstream position from the conveyer roller 64 in the first conveying direction D1, and merges with the first conveyer path R1 at the merge position W, which is at a position upstream from the printer 3 in the first conveying direction D1 along the first conveyer path R1. In this arrangement, the printing apparatus 1 may print images on both side of the printing sheet P through a double-face printing operation.

<Electrical Configuration of Printing Apparatus 1>

Figure 3:
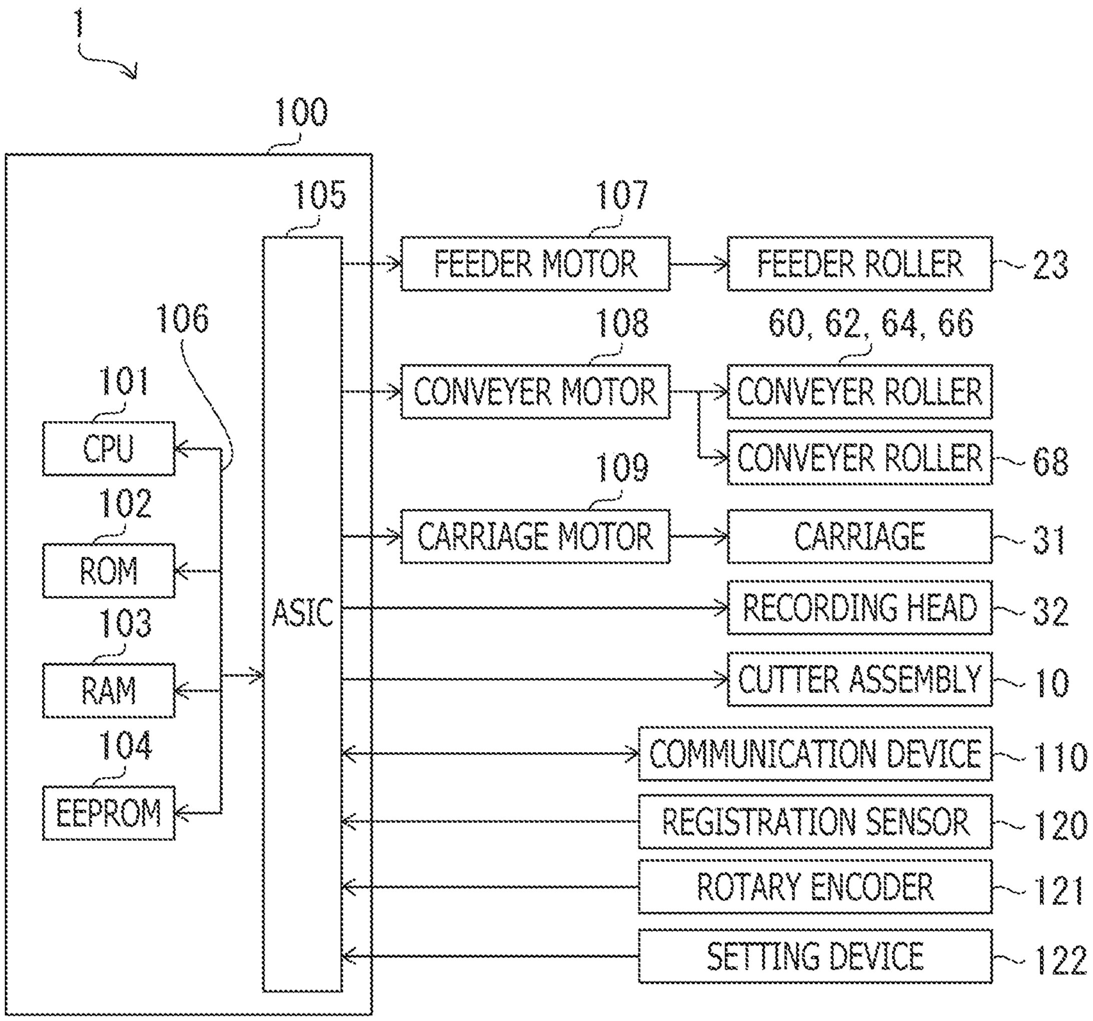
FIG. 3 is a block diagram to illustrate an electrical configuration of the printing apparatus.

FIG. 3 is a block diagram to illustrate an electrical configuration of the printing apparatus 1. As shown in FIG. 3, the printing apparatus 1 includes, further to the components described above, the feeder motor 107, the conveyer motor 108, the carriage motor 109, the controller 100, and a communication device 110.

The controller 100 includes a central processing unit (CPU) 101, a read only memory (ROM) 102, a random access memory (RAM) 103, an EEPROM, and an ASIC 105, which are mutually connected through an internal bus 106. EEPROM is a registered trademark of Renesas Electronics Corp. The ROM 102 may store programs to conduct actions and processes in the printing apparatus 1. The RAM 103 may serve as a storage area to temporarily store various types of data to be used when the CPU 101 executes the programs and a work area for various types of data and programs. The EEPROM 104 stores setting information to be maintained while the power to the printing apparatus 1 is on and off. The controller 100 may control actions of the devices in the printing apparatus 1, including the feeder motor 107, the conveyer motor 108, the carriage motor 109, the recording head 32, and the cutter assembly 10, based on the controlling program read from the ROM 102.

The ASIC 105 is connected with the feeder motor 107, the conveyer motor 108, the carriage motor 109, the recording head 32, the cutter assembly 10, the communication device 110, the registration sensor 120, the rotary encoder 121, and the setting device 122. The ASIC 105 may supply driving current to the feeder motor 107, the conveyer motor 108, the carriage motor 109. The controller 100 may control rotation of the feeder motor 107, the conveyer motor 108, and the carriage motor 109 under, for example, pulse-width modulation control (PWM).

The controller 100 may apply driving voltage to vibrating elements in the recording head 32 to cause the ink droplets to be discharged through the nozzles 33. Moreover, the ASIC 105 is connected with the registration sensor 120 and the rotary encoder 121. The controller 100 may detect conditions of the printing apparatus 1 based on the signals output from the registration sensor 120 and the rotary encoder 121.

In particular, the controller 100 may detect the printing sheet P passing through the contact position, at which the printing sheet P contacts the conveyer roller 60, based on the signals from the registration sensor 120. The controller 100 may detect a rotated amount of the conveyer roller 60 based on the pulse signals output from the rotary encoder 121. Moreover, after the registration sensor 120 outputs the ON signals, the controller 100 may estimate an amount of conveyance of the printing sheet P in the first conveyer path R1 based on the pulse signals output from the rotary encoder 121.

The communication device 110 includes, for example, a USB interface, a LAN interface, and a communication interface. To the USB interface, a USB-connectable device such as a USB memory or a USB cable may be connected. To the LAN interface, an external device, such as a terminal computer, may be connected through a LAN cable. To the communication interface, an external device such as a mobile terminal may be connected through a wireless network.

The controller 100 may receive a print job through the communication device 110 and control the devices in the printing apparatus 1 to print images on the printing sheet P based on print data designated by the print job. Moreover, the controller 100 may conduct a cutting process to cut the printing sheet P, an image-printing process in which double-face printing is performed to a printing sheet P, an image-printing process in which regular order printing is performed to a printing sheet P, and an image-printing process in which backward order printing is performed to a printing sheet P. These processes will be described further below.

[Actions of Printing Apparatus 1]

Figure 4:
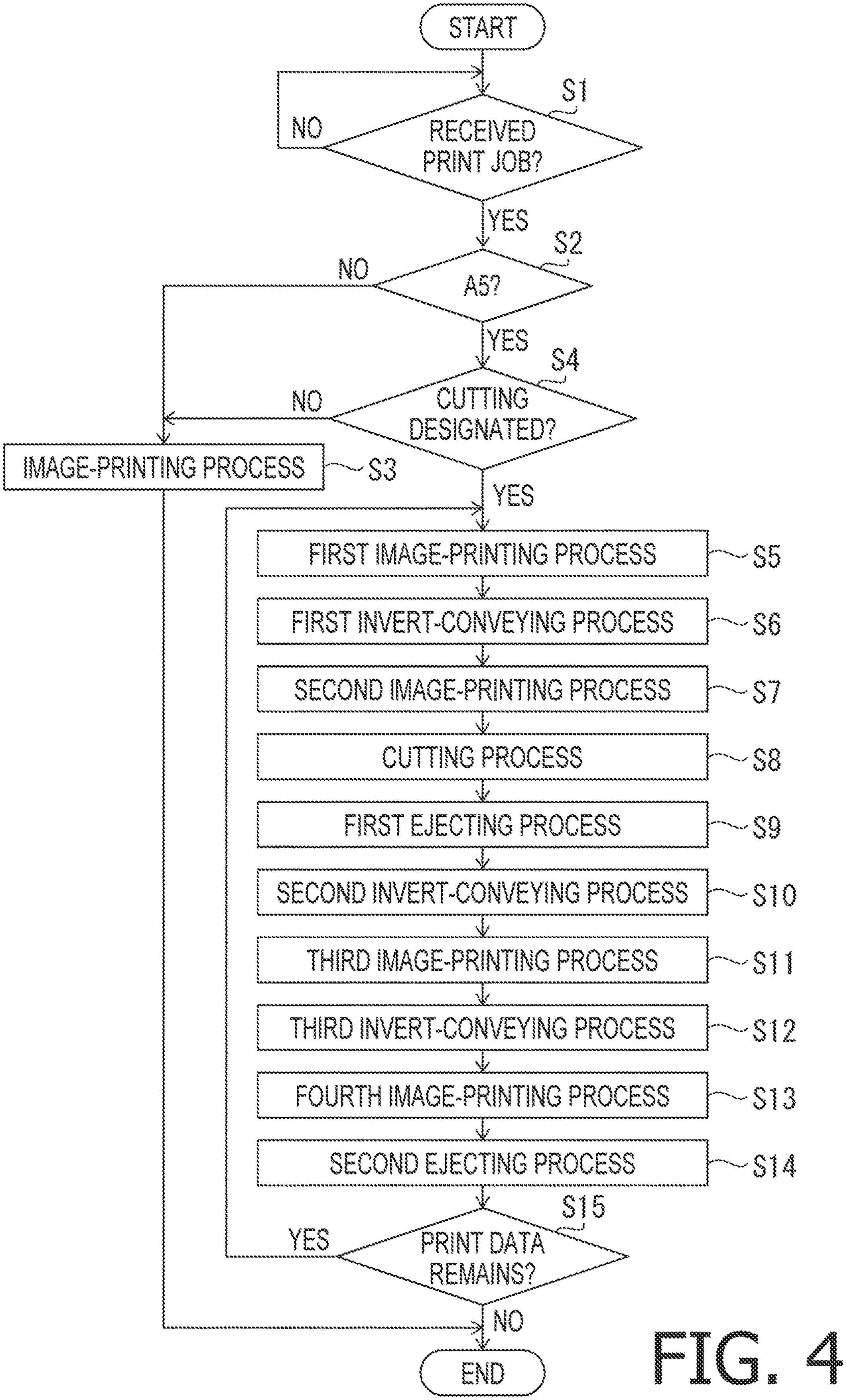
FIG. 4 is a flowchart to illustrate a main part of a flow of a process to be conducted by a controller in the printing apparatus.
Figure 5:
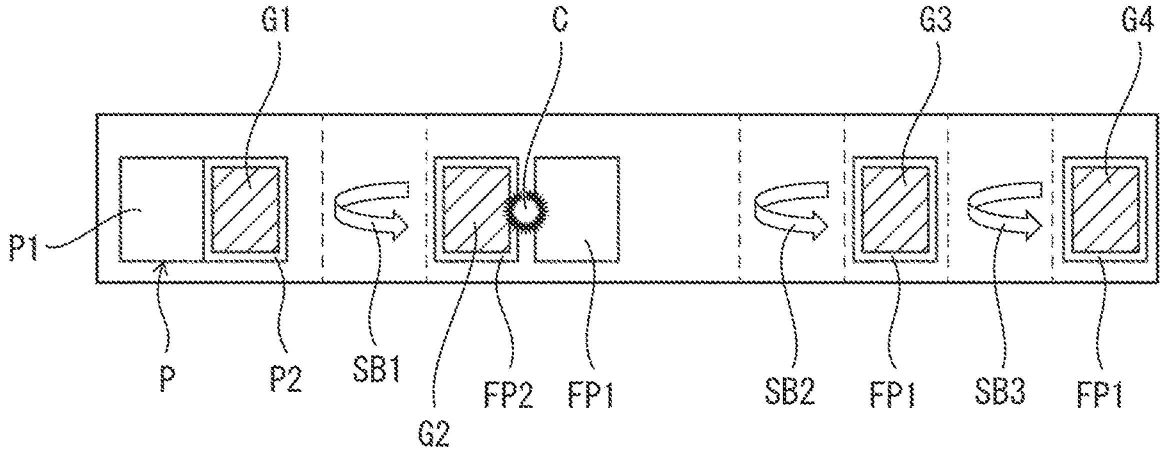
FIG. 5 illustrates how a printing sheet is treated in the process conducted by the controller in the printing apparatus.

With reference to FIGS. 4-5, basic actions of the printing apparatus 1 will be described below. FIG. 4 is a flowchart to illustrate a main part of a flow of the process to be conducted by the controller 100 in the printing apparatus 1. FIG. 5 illustrates how a printing sheet P is treated in the process conducted by the controller 100 in the printing apparatus 1. In the following paragraphs, the image-printing process, in which double-face printing is performed to a printing sheet P, and a cutting process, in which the printing sheet P is cut, will be described. In the cutting process, an exemplary process to cut a printing sheet P in A4 size into printing sheets P in A5 size will be described.

As shown in FIG. 4, in S1, the controller 100 determines whether the communication device 110 received a print job. If the controller 100 determines that no print job is received (S1: NO), the controller 100 waits for a print job to be received.

If the controller 100 determines that a print job is received (S1: YES), the controller 100 determines whether the received print job designates an A5-sized printing sheet P (S2). If the controller 100 determines that the print job does not designate an A5-sized printing sheet P (S2: NO), the controller 100 operates the printer 3 to conduct an image-printing process with print data designated by the print job to print images on a printing sheet P in a size designated by the print job (S3). For example, when the print job designates an A4-sized printing sheet P, the controller 100 operates the printer 3 to conduct an image-printing process to print images on an A4-sized printing sheet P.

On the other hand, in S2, if the controller 100 determines that the print job designates an A5-sized printing sheet P (S2: YES), the controller 100 determines whether the print job designates a cutting action to the printing sheet P (S4). If the controller 100 determines that a cutting action is not designated (S4: NO), the controller 100 proceeds to S3.

On the other hand, in S3, if the controller determines that the print job designates a cutting action (S4: YES), the controller 100 conducts a first image-printing process, in which the controller 100 operates the printer 3 to print an image in a second part on one side of the A4-sized printing sheet P, which is to be cut by the cutter assembly 10 (S5).

In particular, as shown in FIG. 5, while the A4-size has the first part P1 and the second part P2, in the first image-printing process, the controller 100 operates the printer 3 to print an image G1 in the second part P2 on one side being a printable side of the printing sheet P.

Thereafter, the controller 100 conducts a first invert-conveying process, in which the controller 100 operates the conveyer to conduct a switchback action to move the printing sheet P from the first conveyer path R1 to the second conveyer path R2 in the second conveying direction D2 (S6).

Through the switchback action in S6, as indicated by an arrow SB1 in FIG. 5, the printing sheet P is inverted by the conveyer. The printing sheet P is therefore conveyed in the second conveying direction D2 in a posture, in which the second part P2 is located frontward with respect to the first part P1, and the other side opposite to the one side of the printing sheet P faces upward so that the printer 3 may print an image on the other side, which is now a printable side.

Next, the controller 100 operates the printer 3 to conduct a second image-printing process, in which the printer 3 prints an image G2 in the second part P2 on the other side of the printing sheet P (S7). Thereby, as shown in FIG. 5, with the image G2 printed in the second part P2 on the other side of the printing sheet P, double-face printing is performed to the second part P2 of the printing sheet P. In other words, the second part P2 of the printing sheet P has the image G1 and the image G2 printed on a recto and a verso, respectively.

Thereafter, the controller 100 operates the cutter assembly 10 to conduct a cutting process, in which the printing sheet P is cut into a first printing sheet FP1 having the first part P1 and a second printing sheet FP2 having the second part P2 (S8). Therefore, as illustrated by a sign C in FIG. 5, the A4-sized printing sheet P is divided into an A5-sized first printing sheet FP1 and another A5-sized second printing sheet FP2.

Next, the controller 100 operates the conveyer to conduct a first ejecting process, in which the conveyer ejects the second printing sheet FP2 with the double-face printed images at the ejection tray 22 (S9).

Next, the controller 100 operates the conveyer to conduct a second invert-conveying process, in which the conveyer moves the first printing sheet FP1 to the second conveyer path R2 through a switchback action to convey the first printing sheet FP1 in the second conveying direction D2 (S10). Through the switchback action in S10, as indicated by an arrow SB2 in FIG. 5, the first printing sheet FP1 is inverted by the conveyer and conveyed in the second conveying direction D2.

Next, the controller 100 operates the printer 3 to conduct a third image-printing process, in which the printer 3 prints an image on one side being a printable side of the first printing sheet FP1 (S11). In particular, through the third image-printing process in S11, as shown in FIG. 5, an image G3 is printed on one side of the first printing sheet FP1.

Thereafter, the controller 100 operates the conveyer to conduct a third invert-conveying process, in which the conveyer moves the first printing sheet FP1 to the second conveyer path R2 through a switchback action to convey the first printing sheet FP1 in the second conveying direction D2 (S12). Through the switchback action in S12, as indicated by an arrow SB3 in FIG. 5, the first printing sheet FP1 is inverted by the conveyer and conveyed in the second conveying direction D2. The first printing sheet FP1 is therefore conveyed in the second conveying direction D2 in a posture, in which the other side opposite to the one side of the first printing sheet FP1 faces upward so that the printer 3 may print an image on the other side, which is now a printable side, of the first printing sheet FP1.

Next, the controller 100 operates the printer 3 to conduct a fourth image-printing process, in which the printer 3 prints an image on the other side of the first printing sheet FP1 (S13). In particular, through the fourth image-printing process in S13, as shown in FIG. 5, an image G4 is printed on the other side of the first printing sheet FP1.

Next, the controller 100 operates the conveyer to conduct a second ejecting process, in which the conveyer ejects the first printing sheet FP1 with the double-face printed images at the ejection tray 22 (S14).

Next, the controller 100 determines whether the print data designated by the print job received in S1 remains unfinished (S15). If the controller 100 determines that the print data remains unfinished (S15: YES), the controller 100 returns to S5.

On the other hand, if the controller 100 determines that no print data designated by the print job received in S1 remains unfinished (S15: NO), the controller 100 determines that the printing process with the print job is completed and ends the printing process.

While the flow of the process described above includes the third image-printing process and the fourth image-printing process, in which the images are printed on the one side and the other side of the first printing sheet FP1, the embodiment of the present disclosure may not necessarily be limited to the flow described above. For example, when the print data designated by the received print job includes no print data for the image G4, the controller 100 may conduct the second ejecting process without conducting the fourth image-printing process.

[Memory-Saving Arrangement in RAM 103]

With reference to FIGS. 6A-6C, benefits achievable from the printing apparatus 1 that starts the double-face printing operation with the second part P2 located rearward in the first conveying direction D1, rather than the first part P1, will be described. FIG. 6A illustrates how images are printed on one side and the other sides of the printing sheet P in the double-face printing operation. FIG. 6B illustrates a process to rearrange data for the images in the RAM 103. FIG. 6C illustrates the effects of memory-saving arrangement in the RAM 103.

As shown in FIG. 6A, the printing apparatus 1 in the present embodiment may print an image g1 and an image g2 on a recto P2H and a verso P2U, respectively, of the second printing sheet FP2. Further, the printing apparatus 1 may print an image g3 and an image g4 on a recto P1H and a verso P1U, respectively, of the first printing sheet FP1.

In the meantime, FIG. 6B illustrates a comparative example, in which a double-face printing operation starts with a first part of a printing sheet P located frontward in the conveying direction.

As shown in FIG. 6B, in the comparative example, print data units for the images g1, g2, g3 may be transmitted sequentially to the RAM, e.g., a main memory, from an external device through the communication device 110. The printing apparatus in the comparative example may conduct the image-printing process to start with the image g3 among the images g1, g2, g3. Therefore, all of the received print data units for the images g1, g2, g3 may need to be stored in the RAM, and a rearranging process, in which the print data units need to be rearranged in the RAM in the order of image printing i.e., in the order of images g3, g1, g2, is necessary.

As a result, according to the comparative example, a volume of the RAM to be used may not be reduced, and it may be difficult to use the RAM efficiently.

In contrast, according to the embodiment of the present disclosure, image printing in the double-face printing operation starts with the second part P2 of the printing sheet P, which is located rearward in the conveying direction. Therefore, the volume of the RAM 103 to be used may be reduced. In particular, as shown in FIG. 6C, the printing apparatus 1 may print the image g1 on the recto P2H as the print data unit for the image g1 is received and may print the image g2 on the verso P2U as the print data unit for the image g2 is received. Moreover, according to the embodiment described above, after the cutting process, in which the printing sheet P is divided into the second printing sheet FP2 having the second part P2 and the first printing sheet FP1 having the first part P1, the image g3 is printed on the recto FP1H of the first printing sheet FP1.

In this arrangement, the controller 100 may print the images g1, g2, g3 based on the print data units one-by-one sequentially in the received order. Therefore, unlike the comparative example, it is not necessary to store all of the received print data units for the images g1, g2, g3 once or to rearrange the received print data units in the RAM 103. Accordingly, the RAM 103 may be used efficiently, and the volume of the RAM 103 may be reduced.

Moreover, according to the embodiment of the present disclosure, the controller 100 may conduct the cutting process between the second image-printing process and the third image-printing process. Therefore, between the third image-printing process and the fourth image-printing process, deviation of the printing positions of the images may be restrained, and the images g3, g4 may be printed correctly on the recto FP1H and the verso FP1U, respectively, of the first printing sheet FP1.

It may be noted, according to the configuration of the printing apparatus 1, it is possible that the controller 100 conducts the cutting process while the third image-printing process is being conducted. However, if the cutting process is conducted while the third image-printing process is being conducted, there may be a risk that cueing positions to start printing the image g3 and the image g4 on the recto FP1H and the verso FP1U of the first printing sheet FP1 are displaced. In this regard, according to the embodiment of the present disclosure, the cutting process is conducted prior to the third image-printing process. Therefore, the positions to start printing the image g3 on the recto FP1H and the image g4 on the verso FP1U of the first printing sheet FP1 may be restrained from being displaced reliably, and the images g3, g4 may be printed at correct positions so that accuracy and reproducibility of image printing may be improved.

[Reserving Process to First Printing Sheet FP1]

Next, with reference to FIG. 7, a reserving process to the first printing sheet FP1 conducted in the printing apparatus 1 according to the embodiment of the present disclosure will be described. FIG. 7 is a flowchart to illustrate another part of the flow of the process to be conducted by the controller 100 in the printing apparatus 1.

As shown in FIG. 7, following the first ejecting process in S9, the controller 100 determines whether the print data designated by the print job received in S1 remains unfinished (S21). If the controller 100 determines that the print data remains unfinished (S21: YES), the controller 100 proceeds to S10.

On the other hand, if the controller 100 determines that no print data designated by the print job received in S1 remains unfinished (S21: NO), the controller 100 conducts a reserving process, in which the controller 100 operates the conveyer to move the first printing sheet FP1 from the first conveyer path R1 to the second conveyer path R2 and reserve the first printing sheet FP1 to stay in the second conveyer path R2 (S22). When the controller 100 determines that the printing process for the received print job is completed, the controller 100 ends the printing process.

With the reserving process, in the printing apparatus 1 according to the embodiment of the present disclosure, the first printing sheet FP1, which is a blank sheet produced after the cutting process, may be maintained to stay inside the printing apparatus 1 without being ejected. Therefore, the first printing sheet FP1 staying inside the printing apparatus 1 may be used in another printing process. Thus, the printing sheet P may be effectively restrained from being wasted.

[Image-Printing Process After Reserving Process]

Next, with reference to FIG. 8, an image-printing process to be conducted after the reserving process in the printing apparatus 1 according to the embodiment of the present disclosure will be described. FIG. 8 is a flowchart to illustrate another part of the flow of the process to be conducted by the controller 100 in the printing apparatus 1.

As shown in FIG. 8, if the controller determines that the print job designates a cutting action to the A5-sized printing sheet P (S4: YES), the controller 100 determines whether the first printing sheet FP1 is reserved in the second conveyer path R2 (S31). If the controller 100 determines that no first printing sheet FP1 is reserved in the second conveyer path R2 (S31: NO), the controller 100 proceeds to S5.

On the other hand, if the controller 100 determines that the first printing sheet FP1 is reserved in the second conveyer path R2 (S31: YES), the controller 100 conducts the third image-printing process, in which the controller 100 operates the conveyer to convey the reserved first printing sheet FP1 from the second conveyer path R2 to the first conveyer path R1 through the merge position W and operates the printer 3 to print an image on one side of the first printing sheet FP1 having been reserved (S32).

Thereafter, the controller 100 operates the conveyer to conduct a third invert-conveying process, in which the conveyer moves the first printing sheet FP1 with the image printed on the one side thereof to the second conveyer path R2 through a switchback action to convey the first printing sheet FP1 in the second conveying direction D2 (S33).

Next, the controller 100 operates the printer 3 to conduct a fourth image-printing process, in which the printer 3 prints an image on the other side of the first printing sheet FP1 (S34).

Thereafter, the controller 100 operates the conveyer to conduct a second ejecting process, in which the conveyer ejects the first printing sheet FP1 with the double-face printed images at the ejection tray 22 (S35).

Next, the controller 100 determines whether the print data designated by the print job received in S1 remains unfinished (S36). If the controller 100 determines that the print data remains unfinished (S36: YES), the controller 100 proceeds to S5.

On the other hand, if the controller 100 determines that no print data designated by the print job received in S1 remains unfinished (S36: NO), the controller 100 determines that the printing process with the print job is completed and ends the printing process.

With the third image-printing process and the fourth image-printing process after the reserving process, in the printing apparatus 1 according to the embodiment of the present disclosure, the first printing sheet FP1 reserved in the reserving process may be used for the third image-printing process and the fourth image-printing process. Thus, the printing sheet P may be effectively restrained from being wasted.

Optionally, the flow described above may be modified such that the controller 100 conducts the determining process (S36) after the third image-printing process (S32), and if the controller 100 determines that the print data remains, the controller 100 operates the conveyer to conduct the third invert-conveying process (S33); meanwhile, if the controller 100 determines that no print data remains, the controller 100 operates the conveyer to conduct the second ejecting process (S35).

[Regular Order Printing and Backward Order Printing]

Next, with reference to FIGS. 9, 10A-10B, and 11A-11B, regular order printing and backward order printing to be conducted in the printing apparatus 1 according to the embodiment of the present disclosure will be described. FIG. 9 is a flowchart to illustrate another part of the flow of the process to be conducted by the controller 100 in the printing apparatus 1. FIG. 10A illustrates how images are printed through a regular-order double-face printing operation. FIG. 10B illustrates an outcome of the regular-order double-face printing operation. FIG. 11A illustrates how images are printed through a backward-order double-face printing operation. FIG. 11B illustrates an outcome of the backward-order double-face printing operation.

In the following paragraphs, a case, in which data units in print data designated by a print job to create a copy including multiple pages are received in a regular order, and a case, in which data units in print data designated by a print job to create a copy including multiple pages are received in a backward order, will be described. In particular, for the regular order printing, the print data includes a plurality of data units, each of which composes an image for each of the multiple pages, and the plurality of data units are transmitted to the printing apparatus 1 in an incremental order such that a data unit for a first page of the copy is transmitted firstly, and a data unit for a last page of the copy is transmitted lastly. In other words, for the regular page printing, a data unit for a page having a smaller page number in the copy is transmitted earlier, and a data unit for a page having a larger page number in the copy is transmitted later. For the backward order printing, the plurality of data units are transmitted to the printing apparatus 1 in a decremental order such that a data unit for the last page of the copy is transmitted firstly, and a data unit for the first page of the copy is transmitted lastly. In other words, for the backward page printing, a data unit for a page, to which a larger page number in the copy is assigned, is transmitted earlier, and a data unit for a page, to which a smaller page number in the copy is assigned, is transmitted later.

As shown in FIG. 9, if the controller 100 determines that the print job designates a cutting action to the A5-sized printing sheet P (S4: YES), the controller 100 conducts a determining process, in which the controller 100 determines whether the received print job designates the backward order printing (S41). If the controller 100 determines that the print job does not designate the backward order printing (S41: NO), the controller 100 determines that the print job designates the regular order printing and proceeds to S5.

In particular, the controller 100 conducts an image-printing process, in which the printer 3 prints the images on the page basis continuously in the incremental order such that an image based on the data unit for the first page of the copy is printed firstly, and an image based on the data unit for the last page of the copy is printed lastly. In other words, in regular page printing, an image to appear in a page having a smaller page number in the copy is printed earlier, and an image to appear in a page having a larger page number in the copy is printed later.

More specifically, as shown in FIG. 10A, the controller 100 operates the printer 3 to print an image g1 for the first page and an image g2 for the second page on the recto FP2H and the verso FP2U, respectively, of the second printing sheet FP2. Thereafter, the controller 100 operates the printer 3 to print an image g3 for the third page on the recto FP1H of the first printing sheet FP1.

As a result, as shown in FIG. 10B, the second printing sheet FP2 and the first printing sheet FP1 are ejected to rest on the ejection tray 22 in an arrangement such that the verso FP2U of the second printing sheet FP2 faces upward, and the first printing sheet FP1 is placed on the second printing sheet FP2 with the verso of the first printing sheet FP1 facing upward. Thus, through the regular order printing, the printer 3 may print the images on the page basis easily.

On the other hand, if the controller 100 determines that the print job designates the backward order printing (S41: YES), the controller 100 conducts a page-number determining process, in which the controller 100 determines whether a number of pages included in the copy composed of the print data designated by the print job is an odd number (S42). If the controller 100 determines that the number of pages included in the copy composed of the print data designated by the print job is not an odd number (S42: NO), the controller 100 proceeds to S5.

In particular, the controller 100 operates the printer 3 to conduct an image-printing process on the page basis continuously in the decremental order such that an image based on the data unit for the last page of the copy is printed firstly, and an image based on the data unit for the first page of the copy is printed lastly. In other words, in backward page printing, an image to appear in a page having a larger page number in the copy is printed earlier, and an image to appear in a page having a smaller page number in the copy is printed later.

On the other hand, if the controller 100 determines that the number of pages included in the copy composed of the print data designated by the print job is an odd number (S42: YES), the controller 100 operates the printer 3 to conduct a blank-area reserving process (S43), in which a blank page is reserved in the second part P2 on the one side of the printing sheet P without printing an image, rather than the first image-printing process. Thereafter, the controller 100 proceeds to S6.

In particular, the controller 100 conducts the first invert-conveying process, in which the controller 100 operates the conveyer to conduct a switchback action to move the printing sheet P from the first conveyer path R1 to the second conveyer path R2 in the second conveying direction D2 (S6). Thereafter, the controller 100 conducts the second image-printing process (S7) with the data unit for the last page and further operates the printer 3 to conduct an image-printing process on the page basis in the decremental order so that an image based on the data unit for the last page of the copy is printed firstly, and an image based on the data unit for the first page of the copy is printed lastly.

More specifically, as shown in FIG. 11A, the controller 100 operates the printer 3 to reserve the blank area on the recto FP2H of the second printing sheet FP2 without printing an image and print an image g3 for the third page, which is the last page in the copy, on the verso FP2U of the second printing sheet FP2. Thereafter, the controller 100 operates the printer 3 to print an image g2 for the second page on the recto FP1H and an image g1 for the first page on the verso FP1U of the first printing sheet FP1.

As a result, as shown in FIG. 11B, the first printing sheet FP1 and the second printing sheet FP2 are ejected to rest on the ejection tray 22 in an arrangement such that the recto of the second printing sheet FP2 with the image g3 printed thereon faces upward, and the first printing sheet FP1 is placed on the second printing sheet FP2 with the verso FP1U of the first printing sheet FP1 facing upward. Thus, through the backward order printing, the first printing sheet FP1 and the second printing sheet FP2, on which the images from the image g1 for the first page to the image g3 for the last page are printed sequentially, are provided to the ejection tray 22.

As described above, according to the printing apparatus 1 in the present disclosure, the controller 100 may provide the user with a copy of printing sheet P, in which the multiple pages from the first page to the last page are collated, through the image-printing process. Therefore, usability to the user may be improved. Moreover, according to the embodiment, when the print data composes a copy having an odd number of pages, the controller 100 may conduct the blank-area reserving process. In this arrangement, the lowermost page in the copy produced through the image-printing process may be provided as a blank page. Therefore, usability to the user may be improved more effectively.

As described above, the printing apparatus 1 in the present embodiment has the printer 3, the cutter assembly 10 to cut the printing sheet P into the first part P1 and the second part P2, and the controller 100. The controller 100 may conduct the first image-printing process, in which the printer 3 prints an image in the second part P2 on one side of the printing sheet P, the second image-printing process, in which the printer 3 prints an image in the second part P2 on the other side opposite to the one side of the printing sheet P, and the cutting process, in which the printing sheet P is cut into the first printing sheet FP1 having the first part P1 and the second printing sheet FP2 having the second part P2. Accordingly, the printing apparatus 1 capable of cutting the printing sheet P with the double-face printed images may be provided.

Further, the printing apparatus 1 according to the embodiment may conduct the third image-printing process and the fourth image-printing process to the first printing sheet FP1. In other words, double-face printing may be performed with the first printing sheet FP1. Therefore, the second printing sheet FP2 and the first printing sheet FP1, each being processed through the double-face printing operation, may be produced consecutively.

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents.

What is claimed is:

1. A printing apparatus, comprising:
- a conveyer configured to convey a printing medium;
- a first conveyer path, in which the printing medium is conveyed in a first conveying direction;
- a printer arranged in the first conveyer path, the printer being configured to print images on the printing medium;
- a cutter assembly arranged in the first conveyer path at a position downstream from the printer in the first conveying direction, the cutter assembly being configured to cut the printing medium into a first part located frontward and a second part located rearward in the first conveying direction; and
- a controller configured to:
  - control the printer to print an image in the second part, without printing an image in the first part, on one side of the printing medium,
  - after printing the image in the second part on the one side of the printing medium, control the conveyer to move the printing medium from the first conveyer path to a second conveyer path through a first switchback action, the second conveyer path being a path branched from and connected with the first conveyer path, and invert the printing medium by conveying in a second conveying direction, after inverting the printing medium through the first switchback action, control the printer to print an image in the second part on an other side opposite to the one side of the printing medium, and after printing the image in the second part on the other side of the printing medium, control the cutter assembly to cut the printing medium into a first printing medium having the first part and a second printing medium having the second part.

2. The printing apparatus according to claim 1, wherein the controller is configured to, after cutting the printing medium, control the conveyer to move the first printing medium to the second conveyer path through a second switchback action and invert the first printing medium by conveying in the second conveying direction, after inverting the first printing medium through the second switchback action, control the printer to print an image on one side of the first printing medium, after printing the image on the one side of the first printing medium, control the conveyer to move the first printing medium to the second conveyer path through a third switchback action and invert the first printing medium by conveying in the second conveying direction, and after inverting the printing medium through the third switchback action, control the printer to print an image on the other side opposite to the one side of the first printing medium.

3. The printing apparatus according to claim 2, wherein the controller is configured to determine whether backward order printing is designated to print data including a plurality of data units that compose a copy including a plurality of pages of images, and if the controller determines that backward order printing is designated, control the printer to print the images on a page basis in a decremental order such that an image based on a data unit for a last page of the copy is printed firstly, and an image based on a data unit for a first page of the copy is printed lastly.

4. The printing apparatus according to claim 3, wherein the controller is configured to, if the controller determines that backward order printing is designated, further determine whether a number of the pages of images included in the copy composed of the print data is an odd number, if the controller determines that the number of the pages of images included in the copy composed of the print data is an odd number, control the printer to, in place of printing the image in the second part on the one side of the printing medium, reserve a blank area in the second part on the one side of the printing medium, and after reserving the blank area in the second part on the one side of the printing medium, and after inverting the printing medium through the first switchback action, control the printer to print the image in the second part on the other side of the printing medium based on the data unit for the last page of the copy and continue printing the images in the decremental order.

5. The printing apparatus according to claim 3, wherein the controller is configured to, if the controller determines that backward order printing is not designated, control the printer to print the images on a page basis in an incremental order such that the image based on the data unit for the first page of the copy is printed firstly, and the image based on the data unit for the first page of the copy is printed lastly.

6. The printing apparatus according to claim 1, wherein the controller is configured to, after cutting the printing medium, control the conveyer to eject the second printing medium outside the printing apparatus, and after ejecting the second printing medium, control the conveyer to move the first printing medium to the second conveyer path and reserve the first printing medium in the second conveyer path.

7. The printing apparatus according to claim 6, wherein the controller is configured to, after reserving the first printing medium in the second conveyer path, control the printer to print an image on one side of the first printing medium conveyed from the second conveyer path to the first conveyer path, after printing the image on the one side of the first printing medium, control the conveyer to move the first printing medium to the second conveyer path through a second switchback action and invert the first printing medium by conveying in the second conveying direction, and after inverting the first printing medium through the second switchback action, control the printer to print an image on the other side opposite to the one side of the first printing medium.

* * * * *